United States Patent Office 3,297,941
Patented Jan. 10, 1967

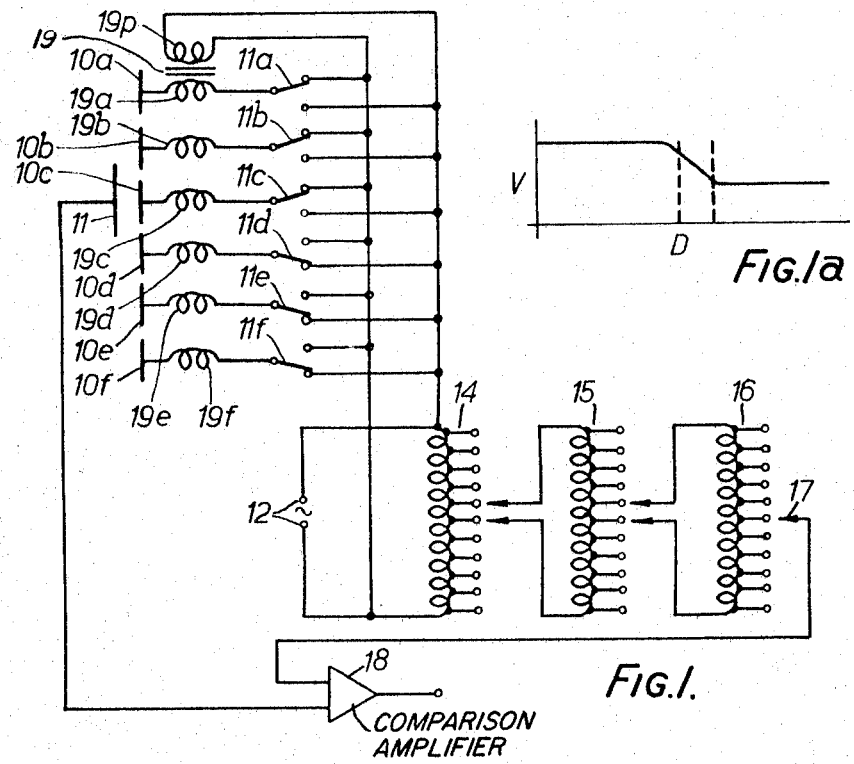
FIG. 1a
FIG. 1.
COMPARISON AMPLIFIER
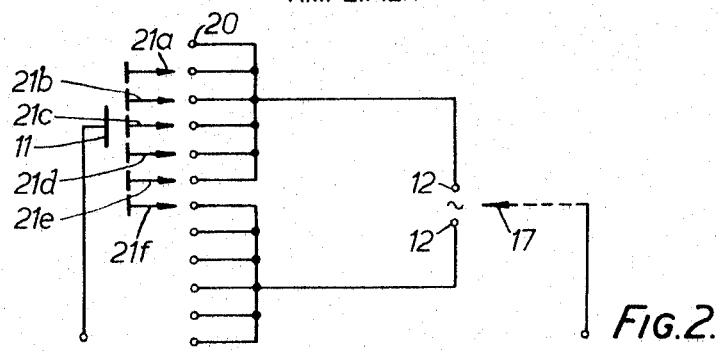
FIG. 2.
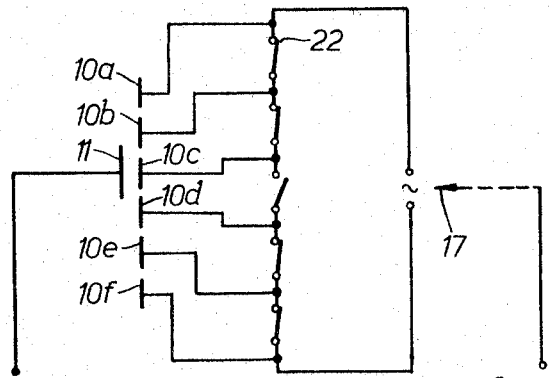
FIG. 3.
INVENTOR
CALEB FREDERICK WOLFENDALE
BY Hane and Nydick
ATTORNEYS

3,297,941
POSITION-SENSITIVE APPARATUS
Caleb Frederick Wolfendale, London, England, assignor to Sogenique (Electronics) Limited
Filed Jan. 21, 1964, Ser. No. 339,250
Claims priority, application Great Britain, Jan. 23, 1963, 2,834/63
6 Claims. (Cl. 323—93)

This invention relates to position-sensitive apparatus, which can be used for the very accurate measurement of movement or which can be used to effect or control very accurately the movement of a moving member. Apparatus of this kind is useful in metrology and in machine tool control, as well as in many other applications.

In accordance with the invention there is provided a position-sensitive apparatus comprising a plurality of elements arranged to form a line of elements, means for impressing alternating voltage on said elements, an interpolating electrode movable relatively to the line of elements whereby a voltage capacitatively induced on the interpolating electrode is indicative of the relative position of the electrode and the elements, means for changing the distribution of voltage existing along the line of elements.

The invention also includes a position-sensitive apparatus comprising a plurality of elements arranged to form a line of elements, means for impressing alternating voltage on said elements to establish an alternating potential between the elements, the field strength at one region along the line of elements being greater than the field strength at a different region along the line of elements, an interpolating electrode movable relatively to the line of elements whereby a voltage induced capacitatively on the interpolating electrode is indicative of the relative position of the electrode and the elements and switching means for effectively controlling the voltage applied to respective elements of the line of elements, thereby to change the position along the line of elements of the region of greater field strength.

Features and advantages of the invention will also appear from the following description of certain forms of the invention, given by way of example, in conjunction with the accompanying drawings in which:

FIGURE 1 is a diagram showing the general arrangement of one form of the invention;

FIGURE 1a is a diagram indicating the response obtained with the apparatus of FIGURE 1;

FIGURE 2 is a detail showing a modification of the arrangement of FIGURE 1, and

FIGURE 3 is a corresponding detail of another form of the invention.

An apparatus in accordance with the invention is shown in FIGURE 1, and includes a transducing means which is shown as consisting of a series of electrode elements 10a, 10b, 10c, 10d, 10e, 10f, which are arranged as a series, to form a line of elements. If the transducer is to respond to, or effect, angular movement the elements may be arcuately arranged, for example as segments of a disc or annulus, whereas if the transducer is concerned with linear movement it is convenient if the elements are formed as a series of short metallic cylinders of circular or other cross-section and arranged end to end, to form a rod-like assembly. For convenience in description, it will be assumed in the present embodiment that linear movement is involved. Co-operating with the elements is a pick-off or interpolating electrode 11, which may take the form of a cylindrical electrode surrounding the line of elements and guided for movement close to, but spaced from, the surface of the elements 10. Guard electrodes can be associated with the interpolating electrode 11. The elements are electrically insulated from each other and from the interpolating electrode.

If an alternating voltage is impressed upon two adjacent elements of the series, an alternating current electrostatic field will be established between the electrodes, and there will be induced upon the interpolating electrode when it is in the field thus produced a voltage which is related to its physical disposition to the two elements. In prior Patent 3,071,758 there is described a system of this kind, in which successively increasing potentials are applied to the successive electrodes of the series, thus providing a field extending along substantially the whole length of the line of elements. By providing some means which is indicative of the voltage existing on the interpolating electrode, it is therefore possible to obtain an indication of the position of the electrode along the line of elements. The induced voltage can be indicated or determined very accurately by means of a bridge or similar null circuit, or for position control, the voltage on the elements can be set very accurately with respect to a reference potential, and the electrode moved with respect to the elements until the induced voltage, with respect to the reference potential, is zero. The voltage induced on the electrode can also be indicated directly as an indication of position but such an arrangement is inherently less accurate than the null method.

In carrying the present invention into effect the available alternating voltage is effectively impressed on less than the total number of elements of the series. Thus, for a given available alternating voltage impressed on the electrodes, the field intensity and hence the voltage induced on the interpolating electrode will be increased. This in turn effects greater sensitivity and accuracy of the system. The field strength will be the greater in the vicinity of the elements adjacent the electrode, and in order that the elements of the series can be used as desired, means are provided for enabling the distribution of voltage along the line of elements to be changed as necessary. Preferably two adjacent electrodes only have an alternating potential impressed upon them, and in order that the interpolating electrode may be used to give an indication over substantially the whole length of the line of elements, switching means are provided for changing the selection of elements upon which the potentials are impressed.

Such is the arrangement adopted in the embodiment of FIGURE 1. As shown, each element 10a . . . 10f is connected respectively to the moving contact of a simple changeover switch 11a . . . 11f. The fixed contacts of each switch are connected to the terminals of an alternating current source 12. It will be seen that by setting the switches 11, the whole of the voltage from generator 12 will appear between any two selected elements; with the switches in the positions shown in FIGURE 1, the elements 10a, 10b and 10c will all be at a first potential and the remaining elements 10d, 10e and 10f will be at the second potential, and the maximum field will exist between elements 10c and 10d, adjacent which, at that setting of switch 11, the electrode 11 will be located or will only be effective.

The potential which is induced on the interpolating electrode 11 will be in relation to a point fixed with respect to the generator voltage, and means are provided whereby a reference potential can be established to a high degree of accuracy. Whilst a variety of means can be adopted for this purpose, a suitable arrangement is shown in simplified form in FIGURE 1 and comprising a number of potential dividers 14, 15 and 16. The potential divider such as 14 may be, for example, a tapped impedance or resistance element, between successive positions of which a predetermined voltage appears. The stage 15 is similar to stage 14, but having across the impedance element a voltage which is only a fraction of that appearing across the element of stage 14, will have accordingly finer steps. With ten steps available from each impedance element, as shown, decade stages are provided, the switch associated with each impedance element affording steps one tenth of those of the immediately preceding stage. There may be as many stages as is required to establish a reference point for the desired accuracy. The last stage, shown as 16, has a tapping point 17 which is the point of reference potential.

The voltage existing between interpolating electrode 11 and the point of reference potential 17 is applied to an amplifying and comparison means 18. The output voltage at 18 can be used to give an indication of the position of electrode 11, or a null-seeking system can be used, in which case the element 18 will operate either to drive the electrode 11 relative to the elements to the null position, for position control, or will adjust the voltage at the reference point 17, to give a position indication. It will be understood that the elements and the electrode can be coupled respectively to the mechanical members the relative position of which it is desired to indicate or control.

The characteristic of the voltage which is induced on the electrode 11, in accordance with its position along the line of elements, is indicated by the diagram of FIGURE 1a. Whilst the electrode is in juxtaposition to elements, such as 10a, 10b, where the potential is the same, the voltage induced will be independent of its position in relation to the electrodes but there is a well defined change when the electrode is moving through the field due to adjacent elements at different potentials. As a consequence of the rapid change of induced voltage that takes place with the system described, the output voltage is more sensitive and more accurate than would otherwise be the case.

In order that the indication may be obtained over the length of the whole line of elements, means are provided for correlating the switches 11, to change the electrodes between which the voltage appears. The operation of the switches 11 in this way affords, in effect, a coarse control of position or indication. Preferably, by suitable choice of the length of electrode 11 in relation to the length of the individual elements 10, the linear portion of the curve indicated in FIGURE 1a can be arranged to be rather greater than the length of the elements themselves, thus removing all ambiguity at the transition when switches 11 are operated. One convenient form is for the length of the interpolating electrode to be approximately equal to twice the axial length of one of the elements.

In making the line of elements 10 in practice, it is likely that small imperfections of pitch may arise, and these in turn will give rise to departures from linearity along the line of elements. It is possible to introduce corrections for these small departures, and one means is fully described in co-pending application Serial No. 554,705 filed June 2, 1966, and shown in FIGURE 1. Application Serial No. 554,705, is a divisional application divided out of co-pending application Serial No. 140,874 filed September 26, 1961. This includes a transformer 19 having a primary winding 19b and a series of coupled secondary windings 19a to 19f included respectively in the connections to elements 10a to 10f. The primary winding 19b is fed from the terminals of source 12, and the secondary windings are individually adjusted to introduce correcting voltages on the elements.

FIGURE 2 shows an alternative way of switching the voltage between the elements 10a, to 10f. In this case a stud-type switch 20 is used, having approximately twice as many positions as there are elements. Each element has a moving contact, 21a to 21f respectively, which are moved as a unit over the studs of switch 20. The studs 20 are arranged in two groups, connected to the terminals of source 12. If the contacts 21a to 21f are moved over the studs, it will be seen that the voltage will appear in turn between different pairs of adjacent elements of the transducer. With such an arrangement it is convenient if the moving electrode 11 moves with the contacts 21a to 21f.

Another form of switching is shown in FIGURE 3. In this case a switch is provided having pairs of contacts 22 which are arranged in series, with the contacts of each pair being arranged between adjacent electrodes 10a, etc. By opening any one of the contact pairs of the contacts 22, the voltage from source 12 will appear across an adjacent and selectable pair of elements.

What I claim is:
1. A position-responsive apparatus comprising:
    a plurality of electrode elements arranged to form a line of electrode elements;
    an interpolating electrode mounted for movement along said line of electrode elements;
    at least first and second supply leads;
    supply means for maintaining a potential difference between said first and second supply leads; and
    a switch means for selectively connecting a first group of said electrode elements to said first supply lead and a second group of said electrode elements to said second supply lead, said first group being adjacent said second group, and for varying the distribution of electrode elements between said first and second groups,
    whereby a voltage capacitively induced on said interpolating electrode is indicative of the position of said interpolating electrode along said line of electrode elements.

2. A position-responsive apparatus according to claim 1, wherein said switch means is operative to connect all the electrode elements in said line to said first or second supply leads, whereby at one time a potential gradient exists along the line of electrode elements only between an electrode element at one end of said first group and the neighboring electrode element at one end of said second group.

3. A position-responsive apparatus according to claim 1, wherein said switch means includes a plurality of switch elements for selectively connecting respective ones of said electrode elements alternatively to said first or second supply leads.

4. A position-responsive apparatus according to claim 1, wherein said switch means includes first and second relatively movable sets of contacts, the contacts of said first set being connected to respective one of said electrode elements, a first group of the contacts of said second set being connected to said first supply lead, and a second group of the contacts of said second set being connected to said second supply lead.

5. A position-responsive apparatus according to claim 1, including voltage divider means for connection between said first and second supply leads to establish a point of reference potential, and output means responsive to the difference between said reference potential and the potential of said interpolating electrode to produce an output signal.

6. A position-responsive apparatus according to claim 1, including individual connections from said electrode elements to said switch means, transformer means having a primary winding and a plurality of secondary windings, said primary winding being connected to said supply means, and said secondary windings being included in respective ones of said individual connections, said transformer means being preadjusted to correct the individual voltages applicable to said electrode elements.

References Cited by the Examiner

UNITED STATES PATENTS

| | | | |
|---|---|---|---|
| 2,980,836 | 4/1961 | Hathaway | 340—187 X |
| 3,004,200 | 10/1961 | Phillips | 340—187 X |
| 3,032,702 | 5/1962 | Scott et al. | 323—54 X |
| 3,071,758 | 1/1963 | Wolfendale | 340—200 X |

JOHN F. COUCH, *Primary Examiner.*

A. D. PELLINEN, *Assistant Examiner.*